United States Patent

Esses

[11] 4,221,069
[45] Sep. 9, 1980

[54] BAIT HARNESS

[76] Inventor: Jack N. Esses, 9612 Ashmont, St. Louis, Mo. 63132

[21] Appl. No.: 956,867

[22] Filed: Nov. 1, 1978

[51] Int. Cl.³ .................................................. A01K 83/06
[52] U.S. Cl. ............................................. 43/44.2; 43/41
[58] Field of Search ........................ 43/44.2, 44.4, 44.6, 43/44.8, 41, 41.2

[56] References Cited

U.S. PATENT DOCUMENTS

| | | | |
|---|---|---|---|
| 1,105,172 | 7/1914 | Anschutz | 43/44.4 |
| 1,114,698 | 10/1914 | Lane | 43/44.4 |
| 1,730,957 | 10/1929 | Valiga | 43/44.4 |
| 2,402,730 | 6/1946 | Bucks | 43/44.4 |
| 2,463,369 | 3/1949 | Finlay et al. | 43/44.4 |
| 3,200,532 | 8/1965 | Walton | 43/44.8 |
| 3,541,719 | 11/1970 | Temple | 43/44.4 |

Primary Examiner—Othell M. Simpson
Assistant Examiner—Roscoe V. Parker
Attorney, Agent, or Firm—Kalish & Gilster

[57] ABSTRACT

A bait harness for use with an elongated shank fishhook, the harness having first and second sets of arm members which define bait-receiving openings, each set of arms being of lengths of resilient wire or ribbon material oriented in a bait-conforming configuration. The length of material associated with each set of arms is formed into a bight for securement of the harness to the shank, there being a length of the material interengaging the sets of arms to maintain the sets of arms in spaced-apart relationship on the shank. The harness effectively and safely secures live bait, such as a minnow in swimming positions on the fishhook adjacent its barbed hook.

6 Claims, 10 Drawing Figures

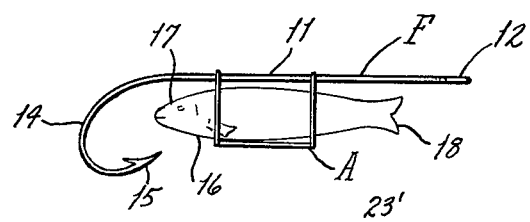
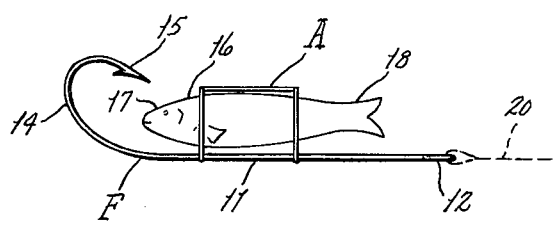
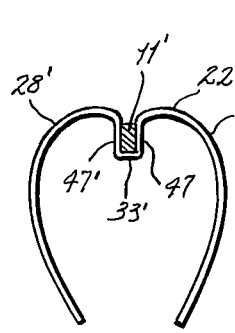
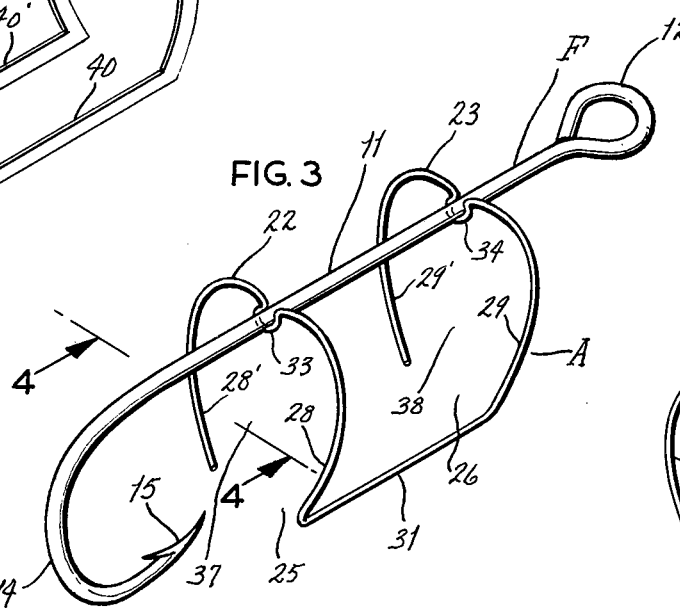
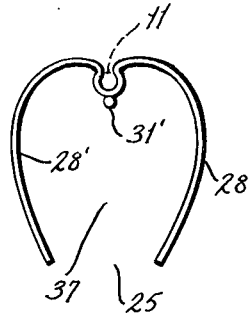
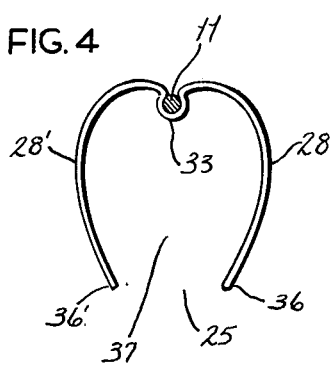
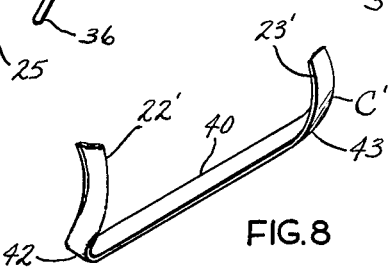
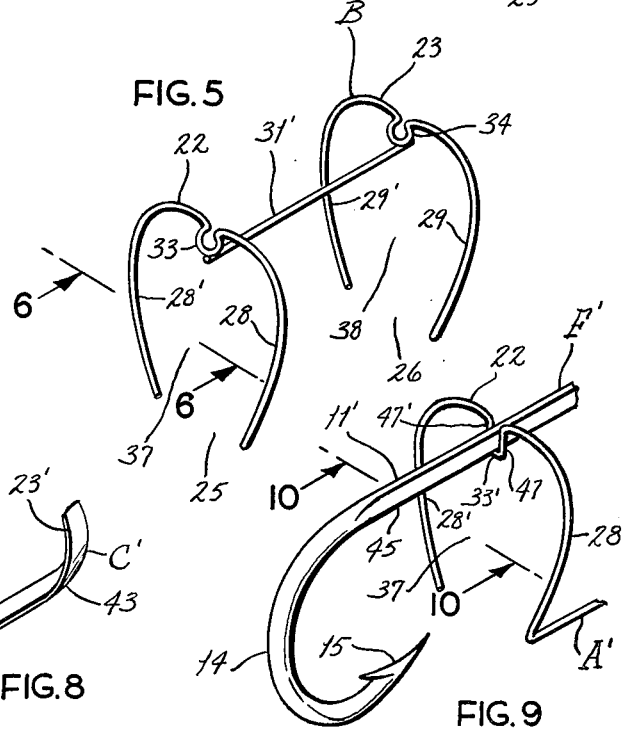

BAIT HARNESS

BACKGROUND AND SUMMARY OF THE INVENTION

This invention relates to fishing tackle, and more particularly, to an improved device for securing bait, especially of the live variety, to a fishhook.

It is often desirable to employ live bait when fishing. A common expedient for this purpose is simply to hook a minnow or other live bait specimen directly to a fishhook by piercing the specimen with the barbed hook. This presents a difficulty particularly when utilizing large fishhooks, since the size of the barb may literally kill or destroy the specimen or so greatly injure a minnow or other small live specimen utilized as bait that it will not remain alive long enough to constitute an effective bait. Even when so secured directly to the barb hook, a bait, such as a minnow, may swim, but in an awkward manner which is in the general direction back toward the angler.

It is desirable to retain a minnow so that its head faces in the direction away from the fisherman, so that the hook will be moved not toward the angler, but rather pulled away from him, in response to swimming of the minnow. It is also desirable to secure live bait, such as a minnow, to the fishhook in such a way that the live bait is not substantially injured, as occurs when pierced with the barbed hook, and so that the bait is permitted to remain in live, healthy condition as long as possible so as to maintain the possible advantages of utilizing live bait.

Accordingly, it is an object of the present invention to provide a bait harness for securing bait to a fishhook adjacent the hook portion thereof without actually piercing such bait with the hook.

A further object of the invention is the provision of such a bait harness which may be utilized to secure a minnow to a fishhook in an orientation with the minnow facing toward the hook so that it will swim generally away from the angler.

Yet another object of the invention is the provision of such a bait harness which safely secures a minnow or other live bait to a fishhook without substantially injuring or damaging such bait, and which permits a minnow or the like to swim relatively unencumbered.

Yet another object of the invention is the provision of such a bait harness which is sufficiently lightweight that it does not substantially add undesirable weight to the fishhook.

A further object of the invention is the provision of such a bait harness which, when used to secure a live minnow to a fishhook, causes the minnow's natural swimming to always maintain the hook in a desired generally upright or inverted position, as may be desired by the angler.

A still further object of the invention is the provision of such a bait harness which is useful with various sizes of fishhooks and particularly the long shank variety, and is selectively engageable and disengageable with respect to the shank of a fishhook so as to be readily and easily secured or removed from the fishhook.

Among other objects of the invention may be noted such a provision of the bait harness which is simply and easily manufactured and of economical construction, and which is of such material as to be resistant to corrosion, maintains its desired shape, and does not undesirably deteriorate in use.

Yet another object of the invention is the provision of such a bait harness which conduces to success in fishing when utilizing various baits, and particularly live baits, such as minnows.

A further object of the invention is the provision of such a bait harness which can be utilized for securing bulky, elongated, or fragile baits to a fishhook.

BRIEF DESCRIPTION OF THE DRAWINGS

FIG. 1 is a side elevational view of a fishhook having secured thereto a bait harness constructed in accordance with one embodiment of a bait harness and embodying the present invention, such bait harness securing a minnow on the fishhook.

FIG. 2 is a view similar to FIG. 1, but depicting the fishhook and bait harness in an alternative inverted position.

FIG. 3 is a perspective view of a fishhook carrying a first preferred embodiment of a bait harness of the invention.

FIG. 4 is an end elevational view of the fishhook-and-bait harness assembly of FIG. 3 taken along line 4—4 of FIG. 3.

FIG. 5 is a perspective view of a second embodiment of the new bait harness.

FIG. 6 is an end elevational view of the bait harness of FIG. 5 taken along line 6—6 thereof.

FIG. 7 is a perspective view of a third embodiment of a bait harness of the invention made of ribbon-form material.

FIG. 8 is a fragmentary perspective view of portions of a bait harness of the general configuration shown in FIG. 7, but depicting an alternate construction utilizing a length of the ribbon-form material for interengaging loop-form sets of arms of the harness.

FIG. 9 is a perspective view of portions of a modified fishhook and further embodiment of a bait harness secured to the fishhook.

FIG. 10 is a cross-sectional view taken along line 9—9 of FIG. 9.

DESCRIPTION OF THE PREFERRED EMBODIMENTS

Referring now to the drawings, a fishhook F is shown in FIG. 1 having secured thereto a first embodiment A of a bait harness of the invention, the fishhook being of the type having a long shank 11 having an eyelet 12 at one end thereof for securement of fishing line to the hook and a curved hook portion 14 at the opposite end having a barbed tip 15 at its extremity. Bait harness A is shown resiliently secured to shank 11 in an orientation harnessing or securing a small fish, or minnow 16, to the fishhook in a position with its head 17 proximate barbed tip 15 and permitting the minnow to swim normally in upright orientation and with the tail 18 of the minnow being free for swimming. The hook 14 thus remains dependent from shank 11 so long as the minnow continues to swim normally.

FIG. 2 illustrates fishhook F in an inverted position with embodiment A of the bait harness secured to shank 11, again securing the minnow 16 with its head 17 proximate barbed tip 15 but with the hook 14 disposed above shank 11, it being understood that, as in the orientation of FIG. 1, this inverted orientation permits the minnow 16 to swim with normal action and with sufficient vigor that the minnow will tend to cause the orientation so depicted to be maintained as it swims in a general direction away from the fishing line extending from the angler, the line being depicted in phantom at 20 in FIG. 2.

FIG. 3 more specifically illustrates embodiment A, which is seen to include first and second sets of arms 22,23 each defining a respective bait-receiving opening 25,26 between the individual arms 28,28' and 29,29' which constitute sets 22 and 23. Embodiment A is preferably constructed entirely of a springy or resilient filament, e.g., stainless steel, wire, or one of various other non-ductile metals such as spring steel which is plated, Parkerized, blued, tempered, or otherwise treated or coated to prevent the metal from being oxidized or becoming corroded in use. A single, continuous length of such resilient material is preferably utilized to construct embodiment A, providing it with an integral character. A rectilinear length 31 of the material extends between legs 28,29 for maintaining the curvilinear bait-conforming sets of arms or loops 22,23 in spaced-apart parallel relationship on shank 11 of fishhook F, it being apparent from FIGS. 1 and 2 that each of the sets of arms 22,23 are in planar perpendicular relationship to shank 11 upon securement of bait harness A to fishhook F and with the respective lengths of material constituting the sets of arms being coplanar.

The new bait harness A is resiliently secured to fishhook F by means of respective crimps or bights 33,34 formed in central portions of each set of arms 22,23, the thin spring-like character of the harness material permitting the new device to be selectively engageable and disengageable with respect to shank 11. Thus, the new bait harness may be readily and easily secured from the fishhook but remains quite securely in position in use, as representatively oriented in FIGS. 1 and 2.

FIG. 4 illustrates that each set of arms 28,28', for example, are configured so that the opening, as at 25, defined by the spaced apart remote portions 36,36' of the arms, is sufficiently large enough to receive a live bait specimen, such as a minnow, but with the loop configuration of the arms extending partially around the bait when secured as depicted in FIGS. 1 and 2.

It is also preferred that each bight, as at 33 in FIG. 4, be constituted by a convolution of the resilient material employed which extends in the direction of the recess, as designated at 37,38, in which the bait is received and secured by the new device, and preferably the bights 33,34 of the loop-form sets of arms actually extend into the respective recesses 37,38 so that the shape of each set of arms is of a somewhat truncated, or open, cardioid configuration, as evident in FIG. 4.

Another embodiment B of the new bait harness is shown in FIG. 5 as having a length 31' of the resilient material of which the bait harness is formed secured interengaging bights 33,34, as by being welded or otherwise fused thereto. Accordingly, the remote portions of each of the sets of arms 22,23 are entirely free. However, such additional length of the material 31' may be employed with an embodiment as shown in FIG. 3 for added strength. Also, embodiment A may be a length of material like that indicated at 31 interengaging the remote ends of arms 28',29' so that one, two, or three or more lengths of material may engage the sets of arms lengthwise of the bait harness.

FIG. 7 illustrates an embodiment C of the new bait harness having lengths of material 40,40' extending between remote portions of sets of arms 22',23' of embodiment C, as adverted to above, but with the entire bait harness of this new embodiment being constructed entirely of a length of resilient ribbon material, such as one of the various metals identified above. Embodiment C depicted in FIG. 7 is such that the sets of arms 22',23' and lengths 40," interengaging the arms all lie in a generally continuous imaginary surface, i.e., a surface which is the locus of parallel lines, permitting the construction of embodiment C to be accomplished by the simple expedient of stamping and forming the curved or loop configuration of each of the bait-receiving recesses 37,38 and bights 33,34 by simple bending operation. Tempering or thermosetting, etc., is then only necessary to impart the desired resilient character of the device.

FIG. 8 illustrates portions of the sets of arms 22',23' with remote portions thereof being secured by an interengaging length of the material 40 with the arms and length 40 being disposed relative to each other by bends 42,43 constituted by a length of the material folded back upon itself, as opposed to the configuration of FIG. 7. Thus, this configuration, designated C', permits construction of the new bait harness by simple bending of a continuous length of metal ribbon rather than by stamping.

It is to be understood that various kinds of live bait other than minnows may be secured to a fishhook by the new bait harness, e.g., slugs, crayfish, etc. Also, various non-live baits usually otherwise secured with difficulty to fishhooks, such as doughballs, lengths of frankfurters, bread, and other elongated or fragile masses may now be secured most advantageously to a fishhook.

For example, the new bait harness may be utilized to secure live bait such as shrimp, shad, various insects, including crickets, grasshoppers, and so forth, and may be made to secure fish larger than minnows by increasing its length and diameter.

Referring to FIG. 9, the embodiments illustrated may be modified as representatively shown therein. FIG. 9 illustrates the securement to a modified fishhook F' of a modified embodiment A' of the invention. More specifically, fishhook F' is seen to have a shank 11' which is provided with flats as illustrated at 45 on opposite sides while the hook portion 14 remains of generally circular cross-section. Thus, it is to be understood that shank 11' has non-circular cross-section and is characterized by at least one flat along its length so that it has polygonal character. Such fishhook F' may be cast or drawn to impart such character, as appreciated from FIG. 10.

Correspondingly, bait holder A' is formed so that each of the bights are of a shank-conforming character. Hence, bight 33' is formed with a pair of substantially rectilinear portions 47, 47' which closely and resiliently engage the flats, as illustrated at 45, of the shank 11' by resiliently impinging the shank therebetween. Understandably, the other set of arms has an identical bight having a non-circular opening which also resiliently and closely engages the corresponding non-circular cross-section of the shank at such bight, but the same is not illustrated in the interest of simplification of the drawings. Accordingly, this modified embodiment A' of the bait harness is even more resistive to being twisted or displaced about the axis of the shank by revolving around the shank, thus maintaining even larger and more physically active live bait specimens in requisite disposition relative to barbed tip 15 of the fishhook.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. For use with a fishhook including an elongated shank and a hook portion at one end thereof, an integrally formed bait harness for resiliently engaging said shank, said harness comprising a single, continuous length of resilient, spring-like, non-ductile material forming first and second sets of spaced apart sets of arm members, each said set of arm members being constituted by an opposed pair of curvilinear portions of said resilient material and defining a bait-receiving recess therebetween, said curvilinear portions being oriented in bait-conforming loop configuration for extending partially around a bait, the arms of each set being integrally joined at a central portion and having portions remote from said central portion, said remote portions being spaced apart to provide said bait-receiving recess there between, each said central portion including a bight for resiliently engaging said shank, each said bight being constituted by a convolution of said resilient material extending in the direction of said bait-receiving recess but opening outwardly from said recess, and a portion of the length of said resilient material extending between remote portions of at least one arm of each set to maintain said sets of arms in spaced apart relationship on said shank, thereby to secure a bait on said fishhook adjacent said hook portion.

2. For use with a fishhook, a bait harness according to claim 1, said resilient material comprising a continuous length of metal wire.

3. For use with a fishhook, a bait harness according to to claim 1, said resilient material comprising a continuous length of metal ribbon.

4. For use with a fishhook, a bait harness according to claim 1, said sets of arms lying in parallel plane, whereby said loops are in planar perpendicular relationship to said shank upon securement of said harness to said fishhook.

5. For use with a fishhook, a bait harness according to claim 1, said fishhook shank being non-circular in cross-section, each said bight defining an opening corresponding to the non-circular cross-section of said shank and resiliently engaging said shank for causing said bait harness to be resistent to twisting movement about said shank.

6. For use with a fishhook, a bait harness according to claim 1, said portion of the length of said resilient material being rectilinear and extending between the outer ends of respective first arms of each set, and a further portion of the length of said resilient material being rectilinear and extending between the outer ends of respective second arms of each set, whereby said single, continuous length of resilient material closes upon itself.

* * * * *